(12) United States Patent
Meehan

(10) Patent No.: US 6,535,458 B2
(45) Date of Patent: *Mar. 18, 2003

(54) METHOD AND APPARATUS FOR SUPPRESSING DRILLSTRING VIBRATIONS

(75) Inventor: Richard Meehan, Cambridge (GB)

(73) Assignee: Schlumberger Technology Corporation, Sugar Land, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,656

(22) Filed: Aug. 5, 1998

(65) Prior Publication Data

US 2002/0080682 A1 Jun. 27, 2002

(30) Foreign Application Priority Data

Aug. 9, 1997 (GB) .............................. 9716825

(51) Int. Cl.⁷ ................................. H04H 9/00
(52) U.S. Cl. .................. 367/81; 367/82; 340/854.4; 181/102
(58) Field of Search ............. 367/81, 82, 162; 340/854.4, 855.6; 181/102

(56) References Cited

U.S. PATENT DOCUMENTS

| 3,191,144 A | | 6/1965 | Pardue |
| 3,252,225 A | | 5/1966 | Hixon |
| 4,020,452 A | | 4/1977 | Trouiller et al. |
| 4,066,995 A | * | 1/1978 | Matthews ................. 367/82 |
| 4,293,936 A | | 10/1981 | Cox et al. |
| 4,390,975 A | | 6/1983 | Shawhan |
| 4,522,271 A | | 6/1985 | Bodine et al. |
| 4,562,559 A | | 12/1985 | Sharp et al. |
| 4,872,526 A | | 10/1989 | Wignall et al. |
| 5,036,945 A | | 8/1991 | Hoyle et al. |
| 5,128,901 A | | 7/1992 | Drumheller |
| 5,229,553 A | * | 7/1993 | Lester et al. ................. 181/102 |
| 5,274,606 A | * | 12/1993 | Drumheller et al. ........... 367/82 |
| 5,289,354 A | | 2/1994 | Clayer et al. |
| 5,381,092 A | | 1/1995 | Freedman |
| 5,510,582 A | * | 4/1996 | Birchak et al. .............. 181/102 |
| 5,728,978 A | * | 3/1998 | Roberts et al. .............. 181/102 |
| 5,796,677 A | * | 8/1998 | Kostek et al. ................. 367/82 |

FOREIGN PATENT DOCUMENTS

| EP | 0 317 386 A2 | 5/1989 |
| EP | 0 563 706 A1 | 3/1993 |
| EP | 0 679 910 A2 | 11/1995 |
| GB | 2 311 427 A | 9/1997 |
| SU | 1687759 A1 | 4/1888 |
| SU | 1154454 A | 1/1984 |
| SU | 1359444 A1 | 3/1986 |
| SU | 1640396 A1 | 10/1988 |
| SU | 1758222 A2 | 1/1990 |
| WO | WO 95/27222 | 10/1995 |

OTHER PUBLICATIONS

Barnes et al.: Passbands for Acoustic Transmission in an Idealized Drill String, 1971, pp. 1606–1608, Jour. of the Acoust. Soc. Amer., vol. 51, no. 5.

Drumheller et al.: The propagation of Sound Waves In Drill Strings, 1995, pp. 2116–2125, Jour. of the Acoust. Soc. Amer., vol. 97, no. 4.

* cited by examiner

Primary Examiner—Timothy Edwards, Jr.
(74) Attorney, Agent, or Firm—Brigitte L. Jeffery; Kevin P. McEnaney

(57) ABSTRACT

Apparatus and methods are described for isolating in a drillstring a device from acoustic noise by introducing between the device and a source of acoustic vibration an noise isolating apparatus, wherein the noise isolating apparatus has adjacent zones of different acoustic impedance. The zones are preferably created by zones of different thickness and designed such that noise suppression occurs in a predetermined range of acoustic frequencies. In a preferred application the apparatus and method is used in combination with drillstring telemetry.

9 Claims, 3 Drawing Sheets

METHOD AND APPARATUS FOR SUPPRESSING DRILLSTRING VIBRATIONS

BACKGROUND OF THE INVENTION

1. Field of the Invention

The present invention relates to apparatus and methods for reducing noise generated by elastic waves travelling through a tubular placed in a wellbore. More specifically, it relates to such noise reducing apparatus and methods for transmitting signals from a subterranean location to the surface using modulated elastic waves, preferably torsional waves.

2. Description of Related Art

Background of the invention is the drilling of subterranean wells. Wells of the type commonly used for hydrocarbon or geothermal exploration are typically less than 30 cm (12 inches) in diameter and on the order of 2 to 8 km (1.5 to 5 miles) long. These wells are drilled using drillstrings assembled from relatively light sections (either 30 or 45 feet long) of drill pipe that are connected end-to-end by tool joints, additional sections being added to the uphole end as the hole deepens.

In addition to this classical method of drilling wells, attempts are made using a continuous reeled drillstring ("coiled tubing) carrying a downhole motor and a drill bit to perform drilling operation. It remains to be seen whether or not these attempts result in a change of drilling technology in the future.

The downhole end of the drillstring typically includes a drill collar, a weight assembled from sections of collar pipes with increasing diameter having an overall length on the order of 300 meters (1000 feet). A drill bit is attached to the downhole end of the drill collar, the weight of the collar causing the bit to bite into the earth as the drillstring is rotated from the surface. Sometimes, downhole mud motors or turbines are used to turn the bit.

Drilling fluid is pumped from the surface to the drill bit through an axial hole in the drillstring. This fluid removes the cuttings from the hole, provides a hydrostatic head which controls the formation gases, provides a deposit on the wall to seal the formation, and sometimes provides cooling for the bit.

Communication between downhole sensors and the surface has long been desirable. This communication is for example an integral part of methods known as Measurement-While-Drilling (MWD) and Logging-While-Drilling (LWD). Various methods that have been tried for this communication include electromagnetic radiation through the ground formation, electrical transmission through an insulated conductor, pressure pulse propagation through the drilling mud, and acoustic wave propagation through the metal drillstring. Each of these methods has disadvantages associated with signal attenuation, ambient noise, high temperatures and compatibility with standard drilling procedures.

The most commercially successful of these methods has been the transmission of information by pressure pulse in the drilling mud. However, attenuation mechanisms in the mud limit the effective transmission rate to less than 10 bits per second, even though higher rates have been achieved in laboratory tests.

This invention is directed towards the acoustical transmission of data through the metal drillstring. The history of such efforts is recorded in columns 2–4 of U.S. Pat. No. 4,293,936, issued Oct. 6, 1981, of Cox and Chancy. As reported therein, the first efforts were in the late 1940's by Sun Oil Company, which organization concluded there was too much attenuation in the drillstring for the technology at that time.

U.S. Pat. No. 3,252,225, issued May 24, 1966, of E. Hixon concluded that the length of the drill pipes and joints had an effect on the transmission of energy up the drillstring. Hixon determined that the wavelength of the transmitted data should be greater than twice and preferably four times the length of a section of pipe.

In 1968 Sun Oil tried again, using repeaters spaced along the drillstring and transmitting the best frequency range, one with attenuation of only 10 dB/1000 feet. A paper by Thomas Barnes et al., "Passbands for Acoustic Transmission in an Idealized Drillstring", Journal of Acoustical Society of America, Vol. 51, No. 5, 1972, 15 pages 1606–1608, was consulted for an explanation of the field-test results, which were not totally consistent with the theory. Eventually, Sun went back to random searching for the best frequencies for transmission, an unsuccessful procedure.

The aforementioned Cox and Chancy patent concluded from their interpretation of the measured data obtained from a field test in a petroleum well that the Barnes model must be in error, because the centre of the passbands measured by Cox and Chancy did not agree with the predicted passbands of Barnes et al. The patent uses acoustic repeaters along the drillstring to ensure transmission of a particular frequency for a particular length of drill pipe to the surface.

More recent patents related to the background of the present invention include U.S. Pat. No. 4,314,365, issued Feb. 2, 1982, This patent discloses a system similar to Hixon for transmitting acoustic frequencies between 290 Hz and 400 Hz down a drillstring.

U.S. Pat. No. 4,390,975, issued Jun. 28, 1983, of E. Shawhan, notes that ringing in the drillstring could cause a binary "zero" to be mistaken as a "one". This patent proposes using a delay to allow the transients to ring down before transmitting subsequent data.

U.S. Pat. No. 4,562,559, issued Dec. 31, 1985, of H. E. Sharp et al, uncovers the existence of "line structure" within the passbands; e.g., "such fine structure is in the nature of a comb with transmission voids or gaps occurring between teeth representing transmission bands, both within the overall passbands." Sharp attributes this structure to "differences in pipe length, conditions of tool joints, and the like." The patent proposes a complicated phase shifted wave with a broader frequency spectrum to bridge these gaps.

U.S. Pat. No. 5,128,901, issued Jul. 7, 1992, of D. S. Drumheller provides further apparatus and methods for transmitting data along a drillstring by use of a modulated continuous acoustical carrier wave centred within a passband of the drillstring. Noise is reduced by multiplying each frequency component of the signal by a factor which depended on the length of the drill pipe section. To eliminate the fine structure of the passbands, echoes are suppressed at each end of the drillstring employing an arrangement of magneto-strictive ring elements as transducers. The method is described to fail for shorter drillstrings with a length of below 3500 feet (1200 m).

U.S. patent application Ser. No. 1687759 A1, apparently describes means for improving the drilling efficiency. A hollow cylinder of composite material is attached to the outer surface of the drillstring. The cylinder is a stack of rings, which absorb elastic wave energy, cause multiple reflections, and disrupt the wave front of an elastic wave. It should be noted that the patent does not relate to the field of downhole data transmission.

The United Kingdom Patent application GB 2311427 provides a mechanical filter to reduce transmission of longitudinal compressional waves along a drill string. The filter a section of tube having relatively compliant walls to which are attached one or more masses via springs. The masses act on the spring to provide high impedance points at particular frequencies.

In view of the above cited prior art it is an object of the invention to provide improved noise reduction and cancellation apparatus and methods for downhole telemetry systems. The system should be compatible with or independent from the various transmission and encoding methods. It is a particular object of the invention to provide such a system for torsional wave telemetry using the drillstring as medium.

SUMMARY OF THE INVENTION

The objects of the invention are achieved by methods and apparatus as set forth in the appended independent claims.

Known analysis of the behaviour of stress waves travelling through a drillstring reveals that, when this stress wave encounters a change of impedance (e.g. a change of cross sectional area, or a change of material properties), some of the wave energy will be transmitted through the impedance contrast, and some will be reflected. The amount of reflected energy depends upon the size of the impedance contrast. The effect of impedance changes on the transmission of stress waves along the drillstring can be quite large. For example, the periodic impedance changes caused by the presence of tool joints in a drillstring leads to passbands in the transmission response, as described in the aforementioned patents.

A basic feature of the present invention is to introduce in the drillstring impedance changes of particular sizes and spacing so as to deliberately create stopbands over particular frequency ranges in order to suppress noise in these frequency ranges.

A preferred location for introducing the impedance changes is situated between the drill bit and any device which has to be protected from noise in particular frequency ranges. The device could be a sensitive mechanical, hydraulical, or electrical unit. In a preferred embodiment of the invention, the device is a transducer section which generates telemetry signals or a downhole drillstring sensor. With the transducer section operating in at least one of the created stopbands, noise arising from the drilling process is effectively cancelled from the transmitted signals.

The impedance changes are preferably introduced by means of a baffle sub, i.e., a specifically designed part of the drillstring. It is preferred to have introduce moving parts into the drillstring. Therefore, in a preferred embodiment of the invention the baffle sub has no parts which move relatively to adjacents parts of the sub. Hence no drilling fluid or debris can enter between moving parts of the baffle and cause friction or other undesired effects.

The width, depth and position of the stop band created by the baffle sub depend upon its geometry, and the drillstring it is connected to. In general, to move the stop band to a lower frequency requires the sub to be longer. The depth of the stop band depends upon both the length of the sub and the size of the impedance contrasts. For torsional waves the impedance contrasts depend upon the ratios of the polar moments of inertia of the different sections of the sub, which are proportional to the radii raised to the power 4. For axial waves the impedance contrasts depend upon the ratios of the cross sectional areas of the sub sections, which are proportional to the radii squared. Hence the stop bands that can be achieved for torsional waves are much deeper than those that can be achieved for axial waves.

Since the sub must be rugged enough to withstand the drilling process, there will be constraints on the minimum outside diameter. The constraints on the maximum outside diameter will be dictated by hole size and well geometry.

In a preferred embodiment of the invention, the impedance changes are generated by introducing a metal sub of essentially cylindrical shape into the drillstring. Whereas preferably the inner diameter of the sub is constant, its outer diameter varies along the longitudinal axis of the cylinder. By filling void zones in the outer surface of the sub with a suitable material, the outer diameter can be rendered uniform again while preserving the impedance changes.

The presence of other acoustic impedance contrasts in the vicinity of the baffle sub, for example because of other BHA components, will have an effect on the response of the system. It may be desirable to consider the drillstring geometry when designing the sub. In this way the performance can be optimized for a particular bottom hole assembly (BHA). Therefore, it may be advantageous to construct the sub from a number of smaller components of the appropriate lengths and diameters. Thus the geometry of the sub can be easily changed when the BHA is changed.

Without dissipating elements or material in the baffle sub, the energy which is unable to pass the baffle sub is reflected back towards the bit.

These and other features of the invention, preferred embodiments and variants thereof, and further advantages of the invention will become appreciated and understood be those skilled in the art from the detailed description and drawings following below.

DESCRIPTION OF THE PREFERRED EMBODIMENT

The invention is based on based on the known analysis of wave energy travelling through the drillstring as described for example by D. S. Drumheller in: "The Propagation of Sound Waves in drillstrings", J. Acoust. Soc. Am., Vol. 97, pp. 2116–2125. Wave energy can travel along the drillstring as axial or torsional stress waves. As the analysis shows, the periodic structure of the drillstring gives rise to a band structure leaving distinct frequency bands for energy transmission (passbands) while suppressing energy in other frequency ranges (stopbands). The analysis further shows that the passbands have a fine structure which however is of no concern for the present application.

Any signal transmitting or telemetry process using stress waves along the drillstring as a medium is hampered by the noise which is generated in the drillstring by the drilling process itself. Several attempts to overcome this problem are described in the references cited above. However, none of the known solutions provided the necessary robustness and versatility required under the hostile ambient conditions of a wellbore during a drilling operation. The following examples demonstrate how a the drilling noise can be cancelled from the transmission path used for the telemetry signals.

Figure 1:
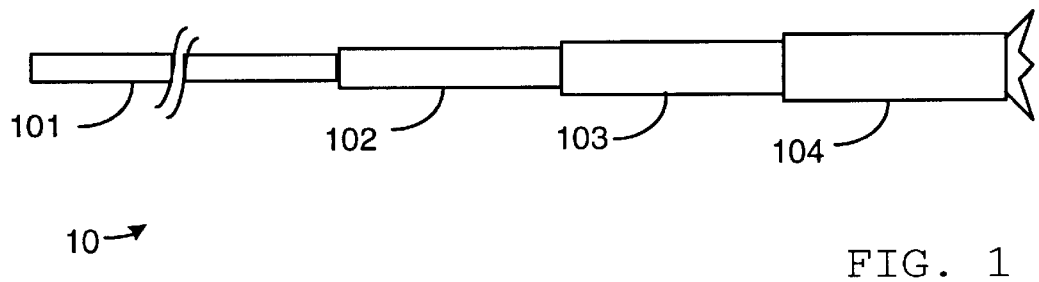
FIG. 1 shows an example of a drillstring.

Basis for the following analysis is a typical drillstring as shown in FIG. 1. The drillstring comprises several sections including a 780 m long section of 5 inch 19.5 lb/ft drill pipe 101, followed by 112 m of 5 inch 50 lb/ft heavy wall drill pipe 102, 100 m of 6 inch drill collar 103 and finally a 100 m long section of 8 inch drill collar 104 terminated by the drill bit 105.

Figure 2:
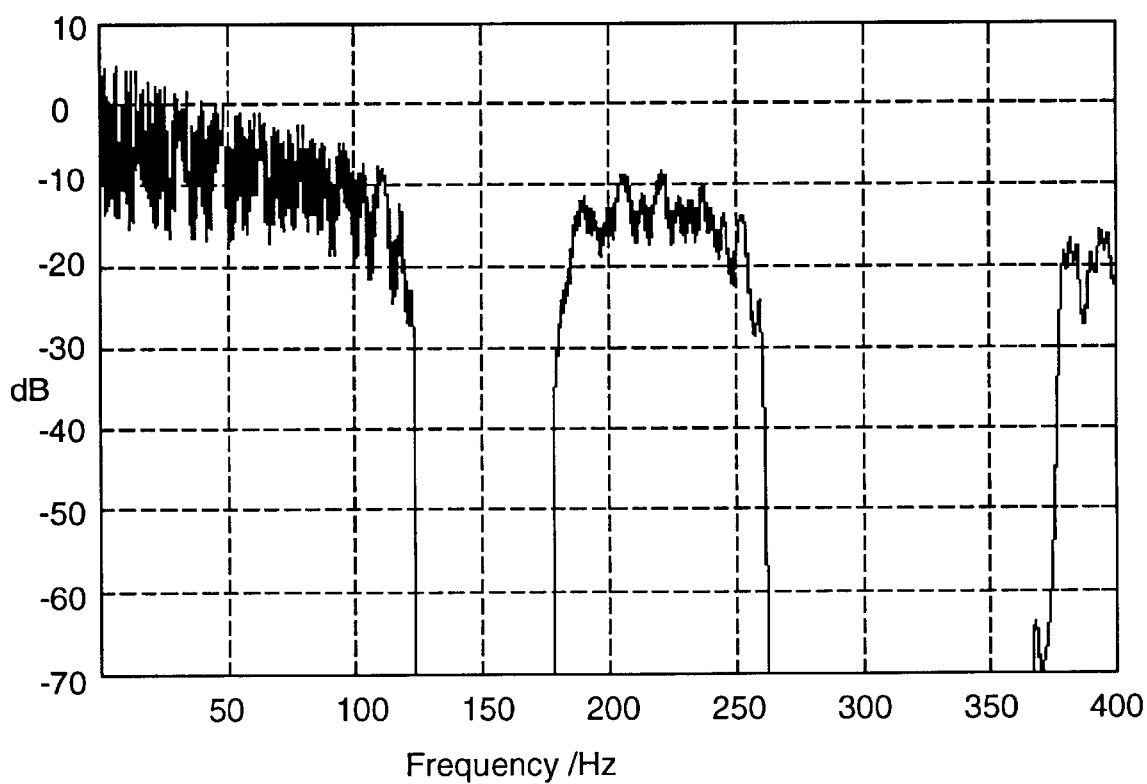
FIG. 2 shows the transmission response of a drillstring for torsional waves.

The internal structure of the drillstring gives rise to a transmission response as depicted in FIG. 2. Though the analysis is made for torsional waves, a similar response spectrum can be derived for other wave forms (e.g. axial waves). According to the transmission response of the drillstring signal transmission should be possible in the frequency ranges 0 to 120 Hz (first passband), 180 to 260 Hz (second passband) and above 370 Hz (third passband). Further passband are not considered in the present example but could equally be employed for signal transmission.

Figure 3A:
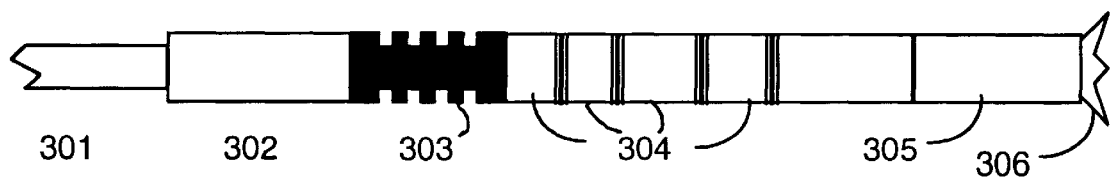
FIG. 3A shows a schematic cross-section through a drillstring including a baffle sub in accordance with an example of the present invention.

Referring now to FIG. 3A, a baffle sub 303 in accordance with the invention is shown. In the example the baffle sub 303 is part of the bottom hole assembly (BHA) 30, located near the end of the 8 inch drill collar section between the signal transmission unit 302 and several measurement-while-drilling (MWD) units 304. The BHA further comprises drill collars 305 and the drill bit 306. The location of the baffle sub is chosen such that during drilling operation the transmission unit 302 is, with respect to the passband used for signal transmission, acoustically isolated from noise stemming from drill bit. More specifically, the baffle sub generates a stopband which at least partly overlaps with the passband used for signal transmission.

The baffle design, as the design for all other apparatus in accordance with the present invention, is apparently dominated by four parameters: the size of the impedance contrasts, the ratio of lengths of the sections with high and low impedance (e.g. thick and thin sections), the absolute length of either of these sections, and the total length of the apparatus or baffle sub.

The depth of the stopband thus generated is controlled by the size of the impedance contrast between the thick and thin sections. As the depth of the stopband increases with the impedance contrast, it can be seen as a first design rule to make this contrast as large as possible. When using a modified drill collar as baffle sub, the freedom to increase the impedance contrast is limited by maximal outer diameter of the drill collar, which is controlled by the well dimension, and its minimal inner diameter, which is limited by the required strength. The absolute values of these limits vary in dependence of well parameters and the material or materials (in case of a composite material)of the sub.

The depth of the stopband also increases as the overall length of the sub increases, leading to a second design rule.

However, the width and position of the stopband(s) is best controlled by using either the absolute width(s) of the section(s) with high or low impedance, respectively, or a ratio of the widths of the section(s) or a combination of both methods.

The positions of the stopbands can be calculated for a periodic structure using for example the method taught by T. G. Barnes and B. R. Kirkwood in: Passbands for Acoustic Transmission in an Idealized Drill String, J. Acoustic. Soc. Am. Vol. 51(2), pp. 1606–1608. Following this method, the following expression for the phase of a torsional wave can be obtained:

$$\cos W = \cos kl_1 \cos kl_2 - M \sin kl_1 \sin kl_2, \quad [1]$$

with $$M = \frac{1}{2}\left[\frac{r_3^4 - r_0^4}{r_2^4 - r_1^4} + \frac{r_2^4 - r_1^4}{r_3^4 - r_0^4}\right] \text{ and} \quad [2]$$

$$k = \omega/C, \quad [3]$$

where c is the wave speed and $\omega$ is the frequency (in radians per second). The lengths $l_1$ and $l_2$ denote the lengths of the two section with different impedance, and the radii $r_i$ denote inner and outer radius of the two sections, respectively (for details see FIG. 3B).

Stopbands occur when $|\cos W|<1$. In general, the depth of the stopbands increases with the number of repeated units in the periodic structure, and with increasing impedance contrast between the two sections. If $l_r$ is the total length of the repeated unit, i.e., $l_r = l_1 + l_2$, then for any given number of $r_0$ to $r_3$ the maximum attenuation in the stopbands occurs when $l_1 = l_2$.

Figure 3B:
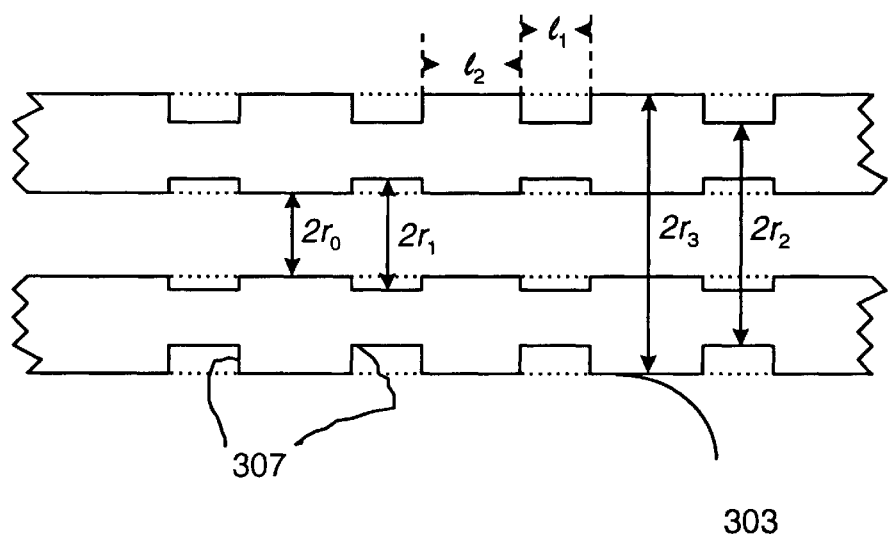
FIG. 3B shows an enlarged view of the baffle sub of FIG. 3A.

Referring to FIG. 3B, details of the baffle sub 303 are shown in FIG. 3B. The sub is produced from two eight inch (i.e. $r_3$=20 cm) drill collars. The total length of the sub is 20 m. Four circumferential grooves 307 are cut into the outer surface of the sub. The grooves have a uniform depth of approximately two inches (5 mm). The width, i.e. $l_1$, of the grooves and their mutual distance ($l_2$) is four meters. The inner radii (i.e. $r_0$ and $r_1$) in the given example are equal (4 cm), although in general they might differ as indicated in FIG. 3B. In accordance with the description above, the location of the stopband is controlled by the width of the grooves and the distance between two adjacent grooves. For some applications, it may be advantageous to fill the grooves with an epoxy resin.

Figure 4:
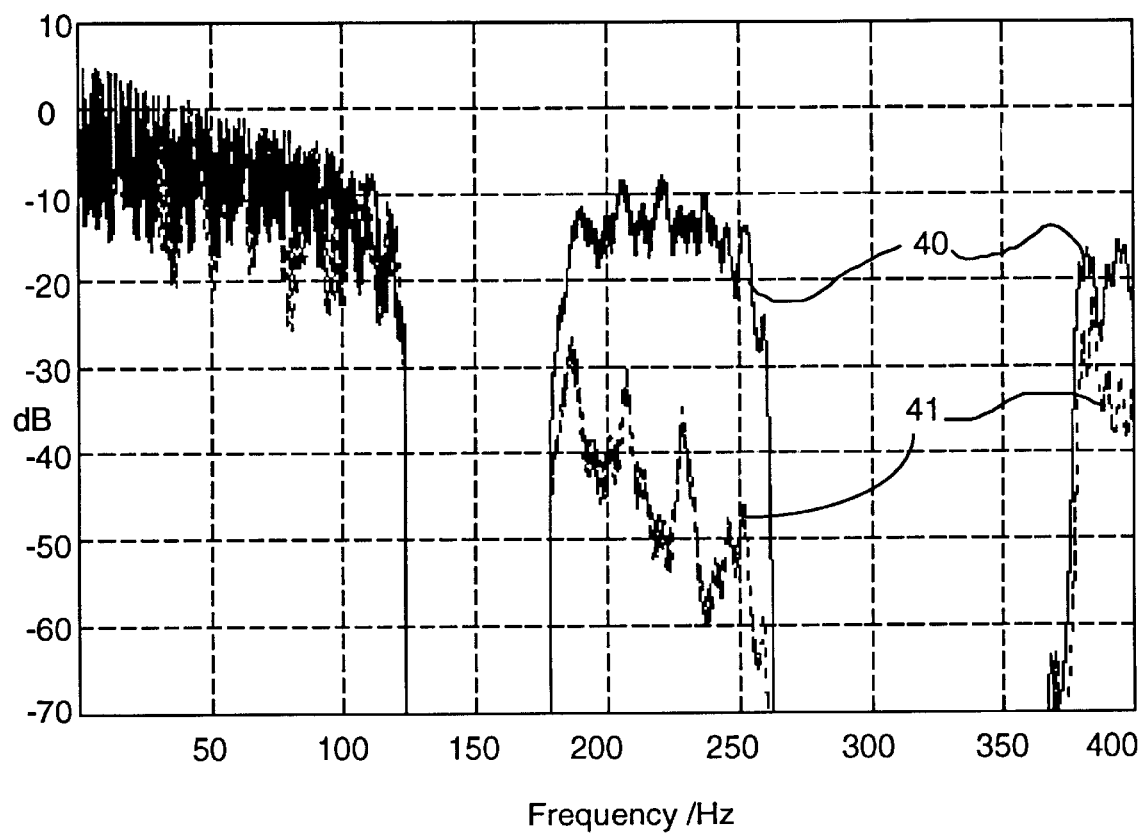
FIG. 4 shows the transmission response of a drillstring for torsional waves without and with (dashed line) the baffle sub of FIG. 3A.

After introduction of the baffle sub, the shape of the transmission response alters. This effect is illustrated by FIG. 4, which compares the original response function 40 with the new response function 41. Notably, the second passband is reduced on average by approximately 30 dB.

Even though the above example refers to torsional wave suppression, it is immediately obvious that the apparatus according to the present invention with little adaptation applies to compressional wave suppression and can be advantageously used in other fields which require an acoustic isolation between two or more sections of the drillstring, e.g. look-ahead seismic measurements.

Figure 5:
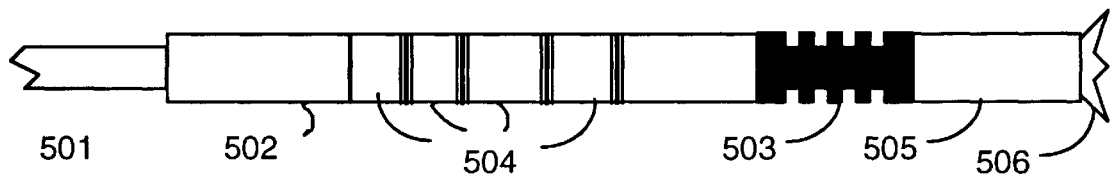
FIG. 5 shows an alternative arrangement for the baffle sub within a bottom hole assembly (BHA).

In FIG. 5, there is shown an arrangement 50 more suitable for look-ahead seismic measurements. In this arrangement, the baffle sub 503 is located between the drill bit 506 and the MWD section 504 so that acoustic energy reflected from the formation and detected using receivers within the MWD section is not contaminated by acoustic noise travelling along the drillstring

I claim:

1. A method for suppressing acoustic noise in a drillstring propagating from a source of acoustic vibration towards a telemetry transmitting unit, said method comprising the step of placing between said telemetry transmitting unit and said source of acoustic vibration a noise suppressing section wherein said noise suppressing section comprises adjacent zones of different acoustic impedance such that noise propagation is suppressed in at least one predetermined frequency band, wherein a plurality of drillstring passbands for energy transmission through the drillstring exits due to a periodic structure of the drillstring, said telemetry transmitting unit transmitting telemetry signals to a telemetry receiver at frequencies within a selected drillstring passband, and said predetermined frequency band includes at least a portion of the selected drillstring passband.

2. The method of claim 1, wherein the telemetry transmitting unit uses torsional waves for transmitting signals to another location.

3. The method of claim 1, wherein the suppressing section comprises a cylindrical base with adjacent zones of varying wall thickness.

4. An apparatus for suppressing acoustic noise in a drillstring propagating from a source of acoustic vibration towards a telemetry transmitting unit, said apparatus comprising: a noise suppressing unit adapted to be placed between the source of acoustic vibration and the telemetry transmitting unit, the suppression unit including adjacent zones of different acoustic impedance such that noise propagation is suppressed in at least one predetermined frequency band, wherein a plurality of drillstring passbands for energy transmission through the drillstring exist due to a periodic structure of the drillstring, said telemetry transmitting unit transmitting telemetry signals to a telemetry receiver at frequencies within a selected drillstring passband, and said predetermined frequency had includes at least a portion of the selected drillstring passband.

5. The apparatus of claim 4, wherein adjacent zones of different impedance are generated by zones of different thickness.

6. The apparatus of claim 4, wherein the zones are arranged periodically.

7. The apparatus of claim 4, essentially consisting of a cylindrical body of steel with a periodic pattern of grooves.

8. The apparatus of claim 7 wherein the grooves are filled with a second material so as to maintain a uniform inner and outer diameter of the cylindrical body of steel.

9. The apparatus of claim 4 wherein the telemetry transmitting unit uses torsional waves for transmitting signals to another location, and the noise suppressing unit is adapted to suppress primarily torsional waves in the at least one predetermined frequency band.

* * * * *